(12) United States Patent
Seenumani et al.

(10) Patent No.: US 12,351,067 B2
(45) Date of Patent: *Jul. 8, 2025

(54) CONTROL SYSTEM AND METHOD FOR A VEHICLE SYSTEM

(71) Applicant: Transportation IP Holdings, LLC, Norwalk, CT (US)

(72) Inventors: Gayathri Indra Seenumani, Niskayuna, NY (US); James D. Brooks, Schenectady, NY (US); David Allen Eldredge, Melbourne, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/155,239

(22) Filed: Jan. 17, 2023

(65) Prior Publication Data

US 2023/0173947 A1 Jun. 8, 2023

Related U.S. Application Data

(63) Continuation-in-part of application No. 16/727,253, filed on Dec. 26, 2019, now Pat. No. 11,565,731.

(51) Int. Cl.
*B60L 58/16* (2019.01)
*B60L 50/15* (2019.01)

(52) U.S. Cl.
CPC ............. *B60L 58/16* (2019.02); *B60L 50/15* (2019.02); *B60L 2200/26* (2013.01); *B60L 2240/545* (2013.01); *B60L 2240/547* (2013.01)

(58) Field of Classification Search
CPC ...... B60L 58/16; B60L 50/15; B60L 2200/26; B60L 2240/545; B60L 2240/547
See application file for complete search history.

(56) References Cited

U.S. PATENT DOCUMENTS

| | | | | |
|---|---|---|---|---|
| 6,459,175 | B1* | 10/2002 | Potega | B60L 53/11 307/132 M |
| 7,444,944 | B2 | 11/2008 | Kumar et al. | |
| 9,744,858 | B2* | 8/2017 | Hall | H02J 50/12 |
| 2010/0001971 | A1 | 1/2010 | Salasoo et al. | |

(Continued)

FOREIGN PATENT DOCUMENTS

| JP | 2014177160 A | 9/2014 |
|---|---|---|
| WO | 2011114443 A1 | 9/2011 |

OTHER PUBLICATIONS

Examiner's Requisition received for related CA Pat. App. No. 3,102,835 dated Feb. 10, 2023 (4 pages).

(Continued)

*Primary Examiner* — Gertrude Arthur Jeanglaude
(74) *Attorney, Agent, or Firm* — K&L Gates LLP

(57) ABSTRACT

A system and method generate a trip plan for a trip of a vehicle system along a route. The usage of an engine or fuel cell during the trip is determined based on engine operational parameters, energy storage device operational parameters, and one or more objectives of the trip desired to be achieved. The usage of the energy storage device during the trip is also determined based on the engine operational parameters, the energy storage device operational parameters, and the one or more objective, including when to charge or discharge the energy storage device during the trip.

20 Claims, 4 Drawing Sheets

(56) References Cited

U.S. PATENT DOCUMENTS

| | | |
|---|---|---|
| 2010/0017448 A1 | 7/2010 | Sivasubramaniam et al. |
| 2013/0332015 A1 | 12/2013 | Dextreit |
| 2015/0003230 A1 | 1/2015 | Mitsumori |
| 2016/0010752 A1 | 1/2016 | Boisvert et al. |
| 2017/0101030 A1 | 4/2017 | Hughes et al. |
| 2018/0025747 A1 | 1/2018 | Morelli et al. |
| 2019/0025607 A1 | 1/2019 | Liao |
| 2019/0359240 A1* | 11/2019 | Domingos .............. B61L 27/33 |
| 2021/0197873 A1 | 7/2021 | Seenumani et al. |

OTHER PUBLICATIONS

First Examination Report received for related AU App. No. 2022204327 dated Oct. 3, 2023 (4 pages).
Luczak, "Progress Rail Offering Diesel-Battery-Electric Hybrids", Railway Age, Sep. 21, 2022 <https://www.railwayage.com/mechanical/locomotives/progress-rail-offering-diesel-battery-electric-hybrids/#> (6 pages).

* cited by examiner

CONTROL SYSTEM AND METHOD FOR A VEHICLE SYSTEM

CROSS-REFERENCE TO RELATED APPLICATIONS

This application is a continuation-in-part of U.S. Pat. No. 11,565,731, filed on 26 Dec. 2019, the entire disclosure of each being incorporated herein by reference.

BACKGROUND

Technical Field

Embodiments of the subject matter described herein relate to controlling movement of a vehicle system.

Discussion of Art

Vehicle systems that travel on routes may travel according to defined trips from starting or departure locations to destination or arrival locations. Each trip may extend along the route for long distances, and the trip may include one or more designated stops along the trip prior to reaching the arrival location. These designated stops may be for a crew change, refueling, picking up or dropping off passengers and/or cargo, and the like. Some vehicle systems travel according to trip plans that provide instructions for the vehicle system to implement during movement of the vehicle system such that the vehicle system meets or achieves certain objectives during the trip. The objectives for the trip may include reaching the arrival location at or before a predefined arrival time, increasing fuel efficiency (relative to the fuel efficiency of the vehicle system traveling without following the trip plan), abiding by speed limits and emissions limits, and the like. The trip plans may be generated to achieve the specific objectives, so the instructions provided by the trip plans are based on those specific objectives.

Multi-source vehicles, or vehicles that include a combination of power sources, may have numerous considerations regarding how to operate, and when to make stops during a trip. For example, with limited numbers of wayside charging systems, determinations need to be made regarding when a vehicle should stop at such a wayside charging system. For multi-source vehicles that use battery power, determinations must be made regarding how far a vehicle may travel, based on variables, including weather, wind, speed limits, vehicle weight, stops and starts, or the like, before the vehicle must stop at a wayside charging system. Similarly, the amount of charge provided, including the time spent recharging a battery directly impacts the amount of time a vehicle is on a trip. Thus, a need exists for forming trip plans that considers variables related to providing a battery powered vehicle, or a multi-source vehicle using battery power.

Additionally, when considering a long trip with a multi-source vehicle, determinations may also need to be made to determine when and how to use the battery to supplement a prime mover of a mechanical power source. In one example, greedy algorithms can be used to determine when to charge and discharge a battery at a specified C-rate. However, depending on different variables associated with the trip, using greedy algorithms may not result in the goals of a desired trip plan.

A trip algorithm for vehicle systems can save fuel by controlling operation of the vehicle systems to reduce the braking energy. While trip algorithms for electric-based vehicle may be used to form trip plans based solely on the operations of an energy storage device, in a multi-source vehicle using such a methodology may cause inefficiencies. Specifically, when powering subsystems such as energy storage device cooling fans, air conditioning and heating units, braking systems, or the like, a tradeoff can exist between improving efficiency or operation of one of the engine or energy storage device, but may be detrimental to the operation of the other. It may be desirable to have systems and methods that differ from those that are currently available.

BRIEF DESCRIPTION

In accordance with one embodiment, a method may be provided for a vehicle system that can move along one or more routes during a trip. The method may include determining a change in life of an on-board energy storage device based on operation of a vehicle subsystem during the trip, determining a change in fuel usage of an engine or fuel cell based at least in part on the operation of the vehicle subsystem during the trip, and switching an operating mode of the vehicle subsystem based at least in part on one of the change in the life of the on-board energy storage device, or the change in the fuel usage of the engine or the fuel cell.

In accordance with one embodiment, a system may include a controller configured to determine a change in capacity of an on-board energy storage device based on operation of a vehicle subsystem during a trip and determine a change in fuel usage of an engine or a fuel cell based on the operation of the vehicle subsystem during the trip. The controller may switch an operating mode of the vehicle subsystem based at least in part on one of the change in the capacity of the on-board energy storage device, or the change in the fuel usage of the engine or the fuel cell.

In accordance with one embodiment, a method may be provided for a vehicle system configured for movement along one or more routes during a trip. The method may include determining a change in life of an on-board energy storage device based on operation of a cooling subsystem during the trip, determining a change in fuel usage of an engine based on the operation of the cooling subsystem during the trip, and switching an operating mode of the cooling subsystem to reduce thermal characteristics of the on-board energy storage device.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
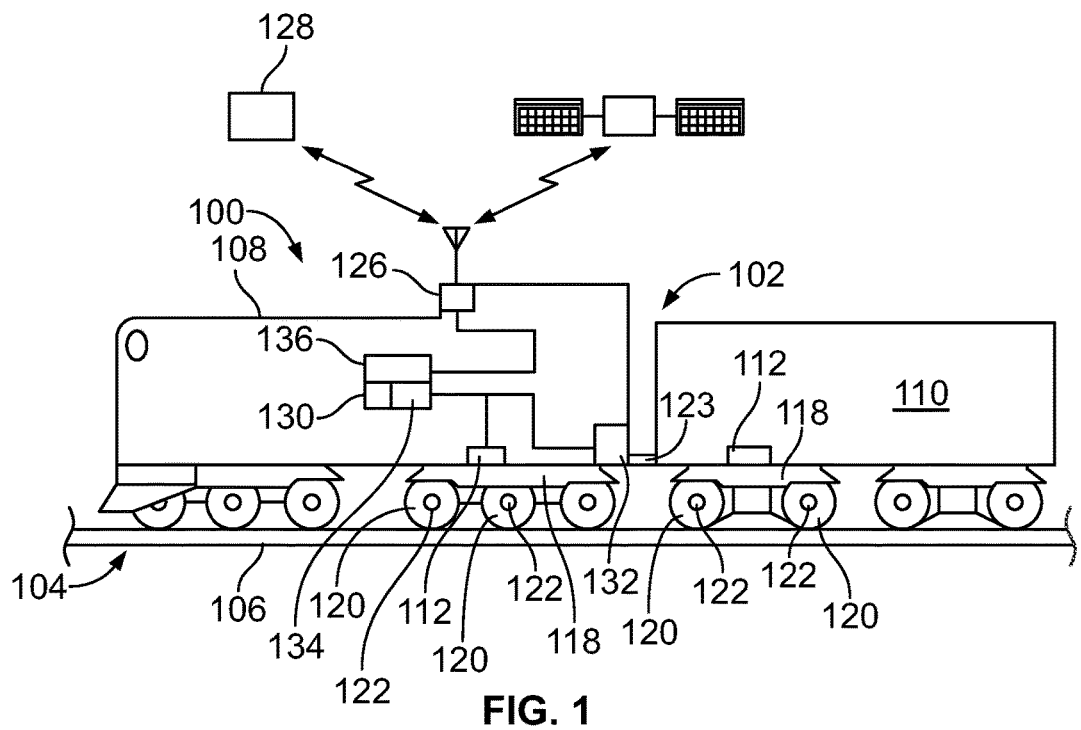
FIG. 1 is a schematic diagram of one embodiment of a control system disposed onboard a vehicle system.

Embodiments of the subject matter described herein relate to a multi-source propulsion-generating vehicle that includes a control system that manages the power flows between power sources of the vehicle. The control system may enhance energy savings (such as fuel savings of an engine or a fuel cell) by managing the flow, while reducing or alleviating degradation of the battery by operating the battery under determined charge/discharge conditions. In one example, the energy management of the control system may leverage railroad specific features such as the availability of track and trip plan information. The control system may solve a multi objective optimization problem that reduces a weighted sum of energy consumption and battery degradation over the trip to determine the combined power forecasts for a given trip. To do so, a battery life model along with reduced order battery thermal model may be utilized to predict the battery degradation. This enables making optimal decisions that can simultaneously or concurrently increase battery life and performance. In using a battery thermal model, the control system may determine measures to take during the trip to improve the life of the energy storage device.

The life of the energy storage device can represent how long an energy storage device may be used or be useful. Life may thus be used to describe the amount of charge an energy storage device has left, the amount of total discharge of the energy storage device, the capacity of the energy storage device, internal resistance including a change in internal resistance, increases and/or likelihood of internal shorting, etc. In this manner, life may be determined by using any characteristics, parameters, feature, or the like related to an energy storage device charge, discharge, capacity, resistance, temperature, chemical properties, etc. Degradation is a general loss of performance of the foregoing factors. Often this is a rise in internal resistance, loss of capacity, and so on.

The control system may determine when thermal characteristics of the energy storage device indicate inefficient (or deleterious) use of the energy storage device. This may include determining the effect of cooling the energy storage device to protect, extend or increase the life of the energy storage device. Still, the control system before generating a trip plan also determines the cost, or fuel burn, that may be required to cool the energy storage device to realize the increased life of the energy storage device. If the cost of the fuel burn is greater than the cost of the energy saved by increasing the life of the energy storage device, the trip plan does not call for cooling the energy storage device. Alternatively, if the cost of the energy saved by increasing the life of the energy storage device outweighs or is greater than the cost of the energy used to realize the savings, the trip plan may include operations of the energy storage device. In one example embodiment, machine learning and/or artificial intelligence (AI) system may be utilized to make determinations related to the use of a battery (e.g., energy storage device) and an engine (including a diesel engine) or a fuel cell. Such a machine learning or AI algorithm in one example may automatically operate the vehicle system for automated operation.

FIG. 1 illustrates a schematic diagram of a control system 100 according to an embodiment. The control system may be disposed on a vehicle system 102. The vehicle system may travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. In one example, the single powered vehicle may be a multi-source energy system driven truck with one or more of a dual fuel engine, a battery bank, a capacitor bank, a fuel cell system, a catenary pantograph/third rail system, and the like.

The propulsion-generating vehicle may generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle may include a braking system 112 that generates braking effort for the vehicle system to slow down or stop itself from moving. In one embodiment, the braking system includes one or both of a friction brake system and a dynamic brake system. The dynamic brake system is relevant because it may be a power source for the multi-source system. Optionally, the non-propulsion-generating vehicle includes a braking system but not a propulsion subsystem. The propulsion-generating vehicle may be referred to herein as a propulsion vehicle, and the non-propulsion-generating vehicle may be referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle.

The control system controls the movements of the vehicle system. In one example, the control system may provide automated control of the vehicle system in real time such that an operator does not have to control the vehicle system. Instead, the vehicle system may be operated based on determinations made using an AI algorithm. In the illustrated embodiment, the control system may be disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 1, the vehicles of the vehicle system each include multiple wheels 120 that engage the route and at least one axle 122 that couples left and right wheels together (only the left wheels are shown in FIG. 1).

Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 123.

The coupler may have a draft gear that can absorb compression and tension forces to reduce slack between the vehicles. Although not shown in FIG. 1, the propulsion vehicle may have a coupler located at a rear end of the propulsion vehicle and/or the car may have a coupler located at a front end of the car for mechanically coupling the respective vehicles to additional vehicles in the vehicle system. Alternatively, the vehicles in a vehicle system may not be mechanically coupled with each other but may be logically coupled with each other. For example, the vehicles may be logically coupled with each other by the vehicles communicating with each other to coordinate the movements of the vehicles with each other so that the vehicles travel together in a convoy or group as the vehicle system.

The control system may further include a wireless communication system 126 that allows wireless communications between vehicles in the vehicle system and/or with remote locations, such as the remote (dispatch) location 128. The communication system may include a receiver and a transmitter, or a transceiver that performs both receiving and transmitting functions. The communication system may also include an antenna and associated circuitry.

The control system further includes a trip characterization element 130. The trip characterization element may provide information about the trip of the vehicle system along the route. The trip information may include route characteristics, designated locations, designated stopping locations, schedule times, meet-up events, directions along the route, and the like.

For example, the designated route characteristics may include grade, elevation slow warnings, environmental conditions (e.g., rain and snow), and curvature information. The designated locations may include the locations of wayside devices, passing loops, refueling stations, passenger, crew, and/or cargo changing stations, and the starting and destination locations for the trip. At least some of the designated locations may be designated stopping locations where the vehicle system may be scheduled to come to a complete stop for a period of time. For example, a passenger changing station may be a designated stopping location, while a wayside device may be a designated location that is not a stopping location. The wayside device may be used to check on the on-time status of the vehicle system by comparing the actual time at which the vehicle system passes the designated wayside device along the route to a projected time for the vehicle system to pass the wayside device according to the trip plan.

The trip information concerning schedule times may include departure times and arrival times for the overall trip, times for reaching designated locations, and/or arrival times, break times (e.g., the time that the vehicle system may be stopped), and departure times at various designated stopping locations during the trip. The meet-up events include locations of passing loops and timing information for passing, or getting passed by, another vehicle system on the same route. The directions along the route are directions used to traverse the route to reach the destination or arrival location. The directions may be updated to provide a path around a congested area or a construction or maintenance area of the route.

The trip characterization element may be a database stored in an electronic storage device, or memory. The information in the trip characterization element 130 may be input via the user interface device by an operator, may be automatically uploaded, or may be received remotely via the communication system. The source for at least some of the information in the trip characterization element may be a trip manifest, a log, or the like.

In an embodiment, the control system may include a vehicle characterization element 134. The vehicle characterization element may provide information about the makeup of the vehicle system, such as the type of cars (for example, the manufacturer, the product number, the materials, etc.), the number of cars, the weight of cars, whether the cars are consistent (meaning relatively identical in weight and distribution throughout the length of the vehicle system) or inconsistent, the type and weight of cargo, the total weight of the vehicle system, the number of propulsion vehicles, the position and arrangement of propulsion vehicles relative to the cars, the type of propulsion vehicles (including the manufacturer, the product number, power output capabilities, available notch settings, power or fuel usage rates, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

The control system has a controller 136 or control unit that may be a hardware and/or software system which operates to perform one or more functions for the vehicle system. The controller receives information from components of the control system, analyzes the received information, and generates operational settings for the vehicle system to control the movements of the vehicle system. The operational settings may be contained in a trip plan. The controller may have access to, or receives information from, a locator device 124 (FIG. 2), a vehicle characterization element, trip characterization element, and at least some of the other sensors 132 on the vehicle system. In one example, the other sensors may include battery sensors that obtain data and information related to battery characteristics, including C-rate, battery life, battery state, battery thermal properties, power boost that may be used to provide additional battery supplementation, battery charging, or the like. The battery sensors may be located at the battery or remote from the battery. In another example the other sensors can be engine sensors that obtain data and information related to engine characteristics, including fuel level, engine temperature, radiator fluid level, engine pressure, engine speed, etc. The engine sensors may be located at the engine, in the engine, remote from the engine, or the like. The sensor data and information, along with the vehicle characterization element and trip characterization element by an AI algorithm to determine the operation of the energy storage device and engine of the vehicle system, including their concurrent use in real time to propel the vehicle system during the trip.

Figure 2:
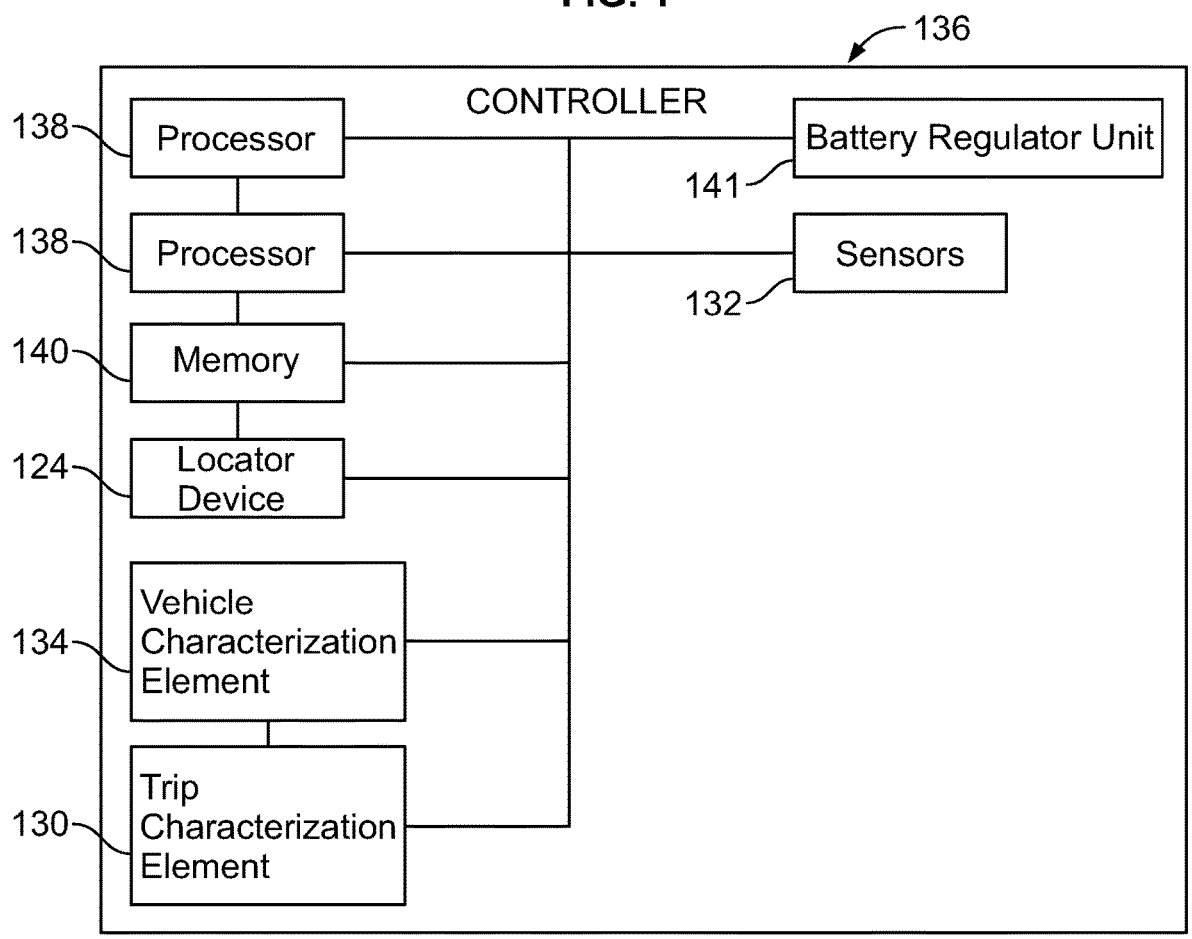
FIG. 2 is a schematic diagram of a controller.

FIG. 2 provides a schematic illustration of a controller that may control operation of a propulsion vehicle. A suitable controller may be a device that includes one or more processors 138 therein (e.g., within a housing). Each processor may include a microprocessor or equivalent control circuitry. At least one algorithm operates within the one or more processors. For example, the one or more processors may operate according to one or more algorithms to generate the trip plan. In one example, the algorithm may be a machine learning or AI algorithm that can utilize numerous inputs, such as battery characteristics, engine characteristics, trip characterization elements, data and information from locator devices such as global positioning system sensors, vehicle characterization elements, data, and information from sensors, or the like. In one example, each input obtained may be provided a weight, and based on the weight, the trip plan, including use of the engine and battery (e.g., energy storage device) during a trip may be determined. After the trip, an analysis can be made by the AI algorithm to determine the accuracy of the trip plan for reducing fuel cost, battery costs, overall costs, fuel efficiency, another trip objective, or the like. Then if the AI algorithm determines any error is presented the weights provided to the data and information obtained may be updated for future use. To determine an error is presented, the actual result from a trip is compared to what was determined prior to the trip. For example, if the objective is to provide the least total cost for a trip, the actual total cost at the end of the trip is compared to the predicted total cost from utilizing the trip plan. If these differ, an error is presented. Based on the error, the weights may be adjusted accordingly. To this end, the controller may communicate with other vehicles in a vehicle network, or outside of a vehicle network to provide additional analysis and determinations related to the weights of each input. As a greater number of trips are undertaken, and more inputs are obtained, and the more accurate the trip plan becomes at meeting its objective (e.g., reducing fuel costs, reducing battery costs, reducing total costs, reducing emissions, or the like).

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons, and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. Several copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller optionally may include a controller memory 140, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random-access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The controller may include a battery regulator unit 141 that may include battery models for calculating battery characteristics including battery C-rate, battery life, battery state, battery thermal properties, power boost that may be used to provide additional battery supplementation, battery charging, or the like. Battery C-rate is the measure of the rate at which a battery may be being charged or discharged. To this end, C-rate may be a measure energy usage or energy consumption. The measurement may be taken by determining the current through the battery divided by the theoretical current draw under which the battery would deliver a nominal rated capacity in one hour as presented in units of 1/hours. Battery degradation is the amount of energy storage capacity lost by a battery and may be measured in units of megawatt hours (MWH). Additionally, information and data determined or derived by the one or more processors, trip characterization element, other sensors, locator devices such as global positioning system sensors, vehicle characterization element, battery regulator unit, etc. may be stored in the controller memory for later processing. By using, collecting, and processing this information and data, the controller may determine operational settings for one or more vehicles for the trip plan.

The operational settings may be one or more of speeds, throttle settings, brake settings, charge rate settings, discharge rate settings, or accelerations for the vehicle system to implement during the trip. Battery charge rate is the measure of the rate at which a battery may be being charged or discharged. The measurement may be taken by determining the current through the battery divided by the theoretical current draw under which the battery would deliver a nominal rated capacity in one hour as presented in units of 1/hours. Battery discharge is the amount charge a battery has discharged. The discharge setting may include the amps used by the energy storage device.

Optionally, the controller may communicate at least some of the operational settings designated by the controller in a control signal. The control signal may be directed to the propulsion subsystem, the braking subsystem, or a user interface device of the vehicle system. For example, the control signal may be directed to the propulsion subsystem and may include notch throttle settings of a traction motor for the propulsion subsystem to implement autonomously upon receipt of the control signal.

In another example, the control signal may be directed to a user interface device that displays and/or otherwise presents information to a human operator of the vehicle system. The control signal to the user interface device may include throttle settings for a throttle that controls the propulsion subsystem. The control signal may also include data for displaying the throttle settings visually on a display of the user interface device and/or for alerting the operator audibly using a speaker of the user interface device. The throttle settings optionally may be presented as a suggestion to the operator, for the operator to decide whether to implement the suggested throttle settings.

Figure 3:
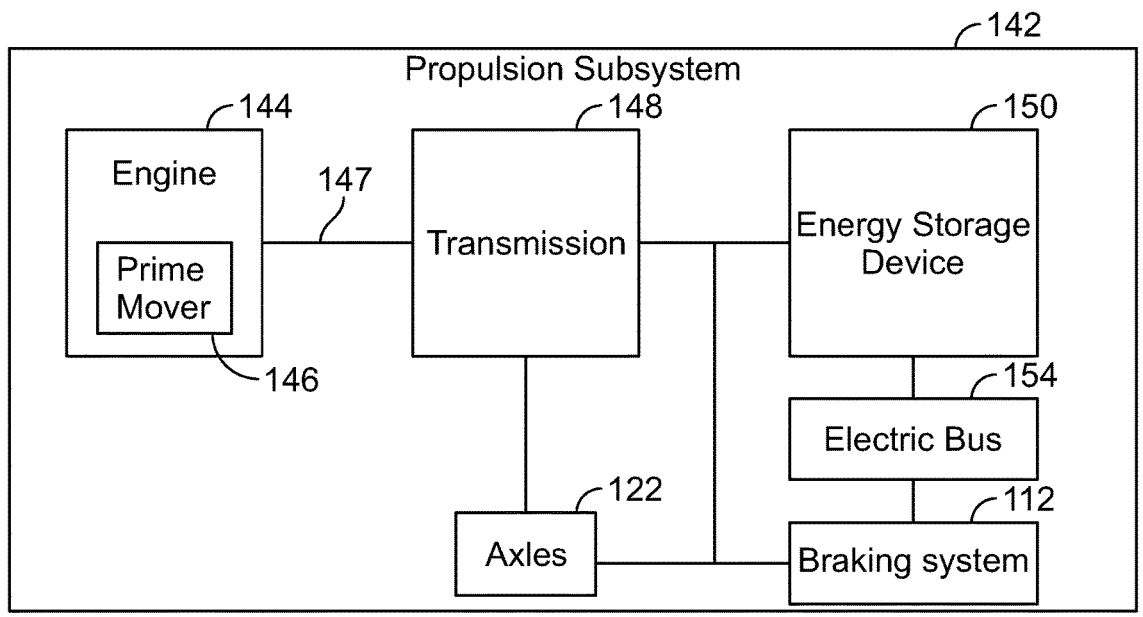
FIG. 3 is a schematic diagram of a propulsion subsystem.

FIG. 3 illustrates a schematic diagram of the propulsion subsystem 142 of the propulsion vehicle of FIG. 1. Again, while FIG. 1 illustrates an example embodiment that presents a rail vehicle, in other example embodiments, other vehicles are provided, including automobiles, dual-fuel trucks, automobiles, off-highway vehicles, mining vehicles, road construction vehicles, or the like. In particular, the propulsion subsystem may be an example propulsion subsystem for any of these vehicles. The propulsion subsystem may include an engine 144 that includes a prime mover 146 that may be coupled to and provides a mechanical input 147 for a transmission 148 to drive the axles. In examples, the engine may be an internal combustion engine, an electric motor, a diesel engine, hydraulic engine, etc. Similarly, the transmission may be a mechanical transmission, electrical transmission, hydraulic transmission, or the like. An alternative to an internal combustion engine may be a fuel cell system (not shown) that converts fuel to electricity.

The propulsion subsystem may include an energy storage device 150, that is electrically coupled to the transmission that allows the energy storage device to drive the axles of the propulsion vehicle. In one example, the energy storage device may be a battery. In particular, the energy storage device may provide energy and may be able to store energy. While a battery provides the electrical energy through a chemical process that may be discharged, charged, and stored, in other examples the energy storage device may store chemical energy, mechanical energy, or the like through other processes. The controller may operate the propulsion subsystem to have only the engine drive the axles, only the energy storage device drives the axles, or the engine and energy storage device may concurrently drive the axles such that the energy storage device supplements the engine to provide motive force to the axles. The controller may control operation of the energy storage device, including determining when to charge and discharge the energy storage device during a trip. In one example the controller may control operation of the propulsion vehicle to maintain a temperature of the energy storage device below a threshold temperature.

The propulsion subsystem optionally, may also include the braking system that includes an electric bus 154 for charging the energy storage device. Specifically, during dynamic braking, electrical power may be generated as a result of the traction motor generating torque to slow a vehicle. Thus, in an example embodiment when the energy storage device may be a battery, the generated electrical power may be transferred from a traction motor through the electrical bus, to the battery, to recharge the battery. In this manner, when such a vehicle may be traversing an upgrade, such as a hill, the battery may increase the battery discharge rate to supplement the engine while traversing up the hill, and then the battery may be recharged through the braking system when the vehicle is going down a downgrade, or the hill, by use of the braking system. In one example, by increasing the battery discharge rate, the power generated going up the hill may be more than non-multi-source-based systems.

Figure 4:
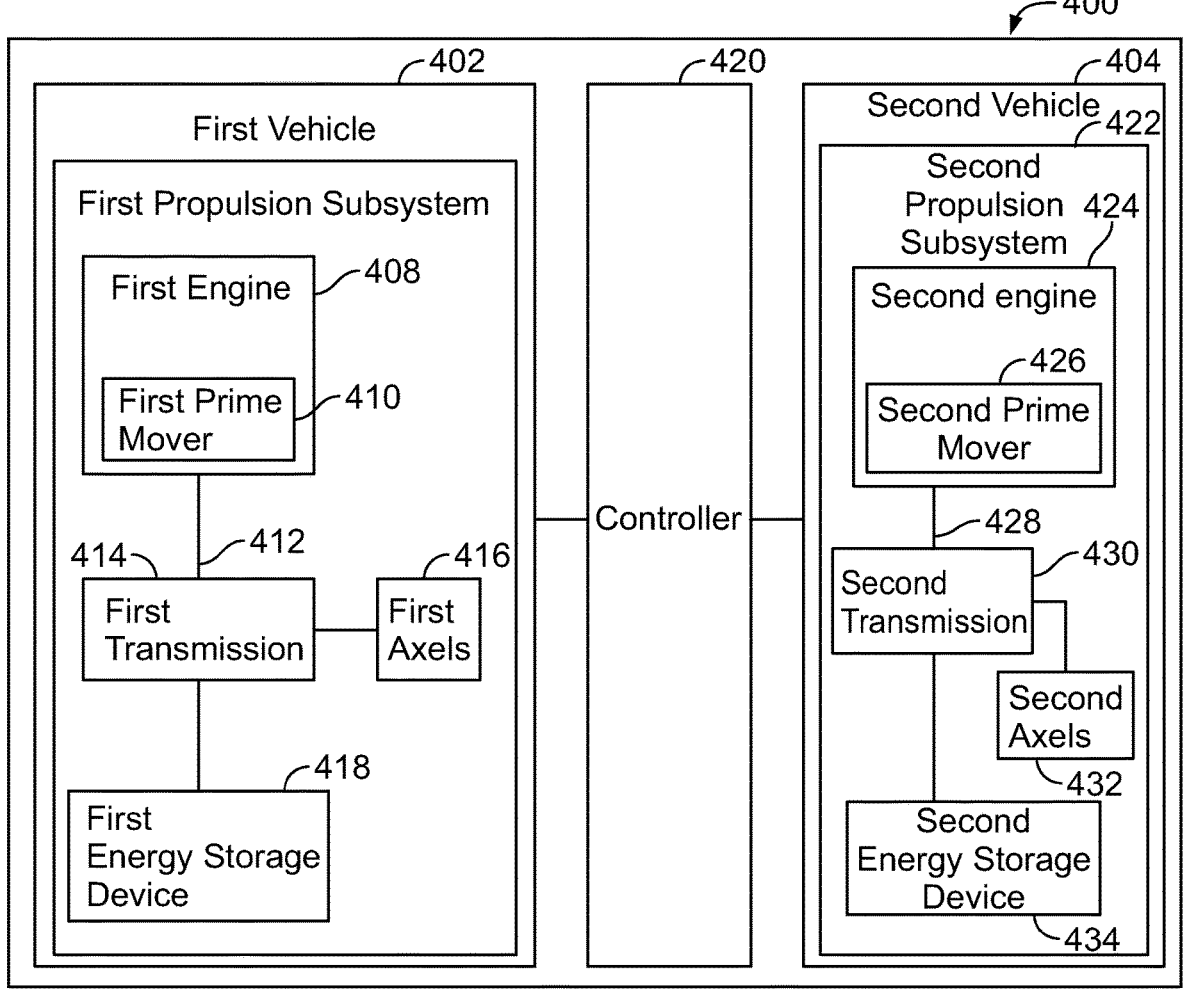
FIG. 4 is a schematic diagram of one embodiment of a vehicle system.

FIG. 4 illustrates a schematic diagram of an alternative embodiment of a vehicle system 400 that has a first vehicle 402 that may be a propulsion vehicle, and a second vehicle 404 that may be a propulsion vehicle. The first vehicle includes a first propulsion subsystem 406 that includes a first engine 408 that has a first prime mover 410. The first prime mover may be coupled to, and provides a first mechanical input 412, for a first transmission 414 to drive first axles 416 of the first vehicle. In one example, the first engine may be an internal combustion engine. In another example, the first engine operates on diesel fuel.

The propulsion subsystem also includes a first energy storage device 418, coupled to the first transmission allowing the first energy storage device to also drive the first axles of the first vehicle. In one example, the first energy storage device may be a battery. An energy storage device may be able to provide energy and may also be able store energy. While a battery provides the electrical energy through a chemical process that may be discharged, charged, and stored, in other examples the energy storage device may store chemical energy, mechanical energy, or the like through other processes.

A controller 420 may operate the first propulsion subsystem to have only the first engine drive the first axle, only the first energy storage device drives the first axles, or the first engine and first energy storage device may concurrently drive the first axles such that the first energy storage device supplements the first engine to provide motive force to the first axles.

The second vehicle similarly includes a second propulsion subsystem 422 that includes a second engine 424 that includes a second prime mover 426 that may be coupled to and provides a second mechanical input 428 for a second transmission 430 to drive a second axle 432 of the second vehicle. In one example, the second engine may be an internal combustion engine. In another example, the second engine operates on diesel fuel. The propulsion subsystem also includes a second energy storage device 434, coupled to the second transmission allowing the second energy storage device to also drive the second axles of the second vehicle. In one example, the energy storage device may be a battery. The controller may operate the second propulsion subsystem to have only the second engine drive the second axles, only the second energy storage device drive the second axles, or the second engine, and second energy storage device may concurrently drive the second axles such that the second energy storage device supplements the second engine to provide motive force to the second axles.

The controller may concurrently operate the first propulsion subsystem and second propulsion subsystem to concurrently drive the first and second vehicles. The controller in one example may operate the first propulsion subsystem and second propulsion subsystem independent of one another. For example, the controller may only take into consideration information and data related to the first propulsion subsystem to drive the first axles without consideration of information from the second propulsion subsystem. In another example, the controller operates the first propulsion subsystem, and second propulsion subsystem together such that information or data related to the first propulsion subsystem may result in dynamic modifications of the second propulsion subsystem.

In one example, the first energy storage device may only have enough charge left to efficiently supplement the first engine for one hour, while the second energy storage device may have enough charge left to efficiently supplement the second engine for three hours. Based on this information, the controller may decrease the amount of discharge from the first energy storage device, making the first propulsion subsystem less efficient, while concurrently or simultaneously increasing the discharge of the second energy storage device, making the second propulsion subsystem more efficient. Thus, overall, the vehicle system may achieve the objective efficiency for the trip without the first energy storage device losing all its charge.

In operation, as the vehicle system travels along the route during a trip, the control system may measure, record, or otherwise receive or collect input information about the route, the vehicle system, and the movement of the vehicle system on the route. For example, the control system may monitor a location of the vehicle system along the route and a speed at which the vehicle system moves along the route. Additionally, the control system may generate a trip plan and/or a control signal based on such information. The trip plan and/or control signal designates one or more operational settings for the vehicle system to implement or execute during a trip as a function of distance, time, and/or location along the route. The operational settings may include tractive and braking efforts for the vehicle system. For example, the operational settings may dictate different speeds, throttle settings, brake settings, accelerations, or the like, of the vehicle system for different locations, different times, and/or different distances along the route traversed by the vehicle system.

The trip plan can achieve or increase specific goals or objectives during the trip of the vehicle system, while meeting or abiding by designated constraints, restrictions, and limitations. Some possible objectives include increasing energy (e.g., fuel and/or stored electric current) efficiency, reducing emissions generation, reducing trip duration, increasing fine motor control, reducing wheel and route wear, or the like. The constraints or limitations include speed limits, schedules (such as arrival times at various designated locations), environmental regulations, standards, limits on audible noise, and the like.

The operational settings of the trip plan may increase the level of attainment of the specified objectives relative to the vehicle system traveling along the route for the trip according to operational settings that differ from the one or more operational settings of the trip plan (e.g., such as if the human operator of the vehicle system determines the tractive and brake settings for the trip). One example of an objective of the trip plan may be to increase fuel and/or stored electric current efficiency by reducing fuel and/or energy consumption during the trip. By implementing the operational settings designated by the trip plan, the fuel and/or energy consumed may be reduced relative to travel of the same vehicle system along the same segment of the route in the same time period but not according to the trip plan.

The trip plan may be established using an algorithm based on models for vehicle behavior for the vehicle system along the route. The algorithm may include a series of non-linear differential equations derived from applicable physics equations with simplifying assumptions. The algorithm may include calculations and algorithms described herein with relation to multi-source vehicles and using an energy storage device to replace or to supplement a fuel converter (i.e., an engine or fuel cell) with a prime mover. In one example, AI systems, models, or the like may be utilized.

In an embodiment, the control system may generate multiple trip plans for the vehicle system to follow along the route during the trip. The multiple trip plans may have different objectives from one another. The difference in objectives may be based on operating conditions of the vehicle system. The operating conditions may be fuel efficiency of the vehicle system, a location of the vehicle system along the route, or the like. For example, the vehicle system may move according to a first trip plan responsive to the vehicle system operating at an efficiency at and/or above a designated threshold efficiency. The vehicle system may move according to a different, second trip plan responsive to the vehicle system traveling at an efficiency below the designated threshold speed. Both the first and second trip plans may be generated by the control system prior to the vehicle system embarking on the trip. Alternatively, only the first trip plan may be generated prior to the trip, and the second trip plan may be generated during the trip of the vehicle system in response to the operating condition of the vehicle system crossing the designated threshold. For example, the second trip plan may be a modified trip plan or a trip re-plan that modifies or updates the previously generated first trip plan to account for the changing objectives.

In an alternative embodiment, instead of generating multiple different trip plans, the control system may generate a single trip plan that accounts for changing objectives of the vehicle system along the route. For example, the trip plan may constructively divide the trip into multiple segments based on time, location, or a projected speed of the vehicle system along the route. In some of the segments, the operational settings of the trip plan are designated to drive the vehicle system toward achievement of at least a first objective. In at least one other segment, the operational settings of the trip plan are designated to drive the vehicle system toward achievement of at least a different, second objective.

The control system may control the vehicle system along the trip based on the trip plan, such that the vehicle system travels according to the trip plan. In a closed loop mode or configuration, the control system may autonomously control or implement propulsion and braking subsystems of the vehicle system consistent with the trip plan, without requiring the input of a human operator. In an open loop coaching mode, the operator may be involved in the control of the vehicle system according to the trip plan. For example, the control system may present or display the operational settings of the trip plan to the operator as directions on how to control the vehicle system to follow the trip plan. The operator may then control the vehicle system in response to the directions. In yet another example, the control system automatically operates the vehicle system without inputs from an operator by implementing the trip plan.

Figure 5:
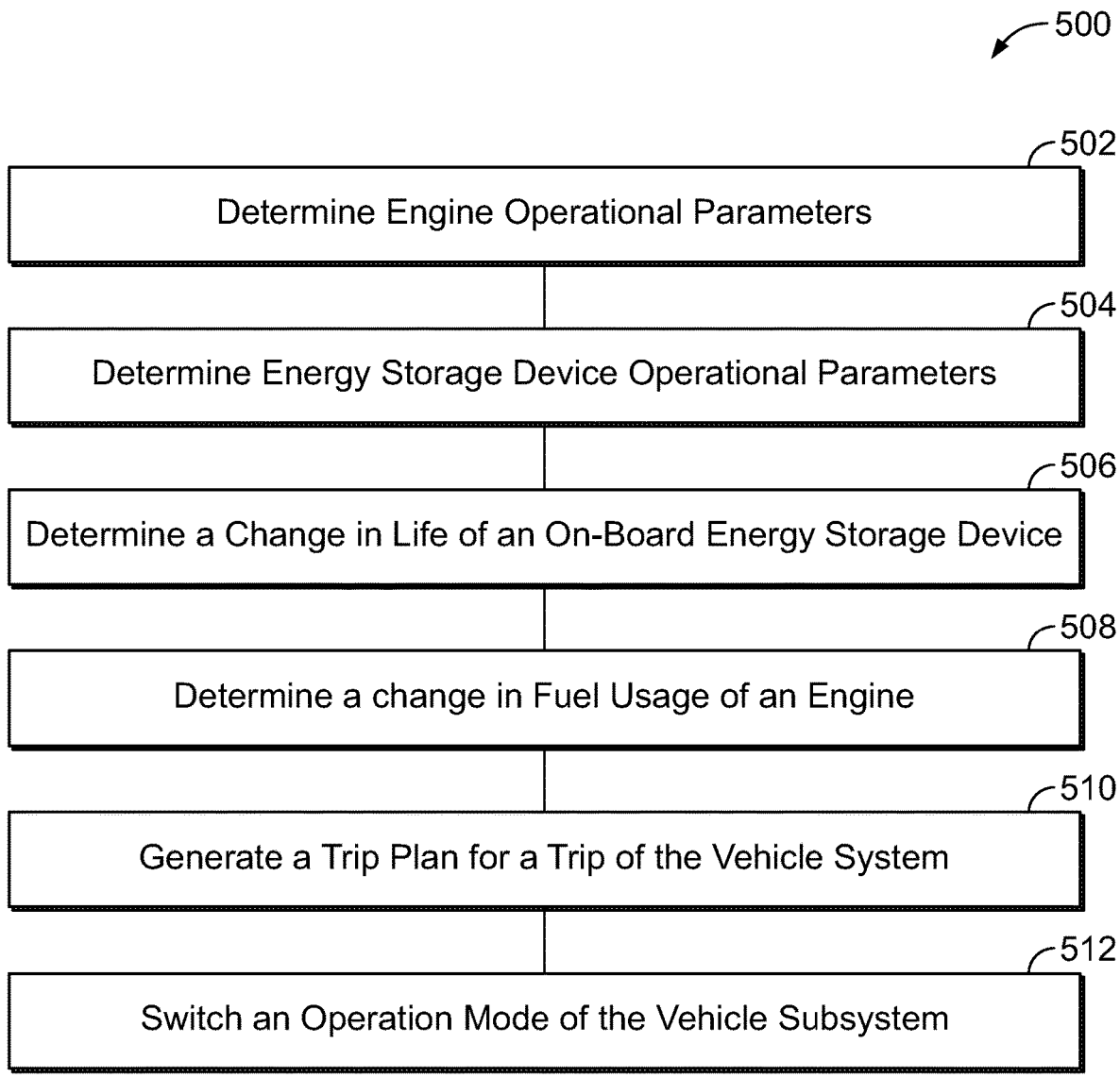
FIG. 5 is a flow chart of one embodiment of a method for controlling a vehicle system that travels on a route.

FIG. 5 is a flow chart of one embodiment of a method 500 for controlling a vehicle system that travels along one or more routes. At step 502, engine operational parameters are determined. Engine operational parameters may include data, information, measurement, calculation, model, formula, or the like, that may be used to determine a characteristic of the engine. These characteristics may include engine life, engine power, engine capacity, engine wear, engine use, engine size, vehicle size, trip route, engine history in weather conditions, grade of route, engine performance data, or the like. In one example, engine operational parameters are engine characteristics.

As an example, in one embodiment a standard point mass representation may be considered in an embodiment for a vehicle system to calculate the tractive power requirement of a trip as provided:

$$dvdt = F/m - g(x) - a - bv - bv2$$

Where v is vehicle system speed, t is a function of time, F is the tractive effort or force, m is vehicle system mass, g(x) if the effective grade of the trip, a and b are Davis drag coefficients and the trapezoidal discretization of the point mass model is:

$$h(Fk, Fk+1, \alpha k, \alpha k+1, \delta xk, a, b, c) = 0$$

Where F is the tractive effort or force, k is an index of a mesh point, $\alpha$ is inverse speed, $\delta xk$ is $xk - xk - 1$, x is the distance along the trip and is an independent variable, and a, b, and c are Davis drag coefficients. The vehicle characteristics can be 1D lookup tables or engine fuel-rate interpolated as a function of engine horsepower as given as:

$$\gamma k = \Gamma(Pek)$$

where $\gamma$ is fuel rate burn, k is an index of a mesh point, and Pe is the engine power.

At step 504, energy storage device operational parameters are determined. Energy storage device operational parameters may include any data, information, measurement, calculation, model, formula, or the like that may be used to determine a characteristic of the energy storage device. Example energy storage device operational parameters may include initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency. In one example, the energy storage device operational parameters are battery characteristics.

In one example, a predictive battery life model may be used to determine the battery life. In one example, the battery life, or energy storage device life, may be modeled based on fuel consumption of a vehicle while the energy storage device may be used along one or more routes. A battery life model may compute the degradation associated with a Lithium Ion (Li-ion) battery. The rates of degradation are dependent on the operating conditions described by temperature, voltage, and depth of discharge along with the number of cycles of the battery. The battery end of life may be then determined when the capacity fades by (for example) 20-30% of the rated capacity. For solving the energy management problem, an optimization-oriented approximation of the life model may be considered. The detailed model considers resistance growth (R) and capacity fade as degradation mechanisms, where cell resistance growth due to calendar and cycling driven mechanisms may be predominantly additive as provided:

$$R = A0 + A1\Delta life0.5 + A2\Delta life$$

Where A is a parameter that can be fit to a specific kind of Li battery based on cell test data, and $\Delta$tlife is the change in lifetime of the battery. However, cell capacity is assumed to be controlled by either loss of cyclable Lithium or loss of active sites as follows:

$$QLi = B0 - B1\Delta life0.5$$

Where QLi is the loss of cyclable Lithium, B is another parameter that can be fit to a specific kind of Li battery based on cell test data, and $\Delta$tlife is the change in lifetime of the battery. Also used is:

$$Qsites = C0 - C2\Delta life$$

Where Qsites represents the loss of active sites, C is a parameter that can be fit to a specific kind of Li battery based on cell test data, and $\Delta$tlife is the change in lifetime of the battery.

The capacity fade may be relatively more limiting than the resistance growth. Furthermore, the energy storage usage during driving vehicle systems would experience more cyclic fade than the capacity fade. The degradation rate is then Qsites where degradation factor C2 is given by:

$$C_2 = \frac{C_{2,ref}}{\Delta t_{cyc}} \int_{\Delta t_{cyc}} \left( e^{\left[\frac{E_\alpha}{R_{ug}}\left(\frac{1}{T(t)} - \frac{1}{T_{ref}}\right)\right]} \times e^{\left[\frac{\alpha_{c2} F}{R_{ug}}\left(\frac{V(t)}{T(t)} - \frac{V_{ref}}{T_{ref}}\right)\right]} \right) dt \times \left(\sum_i N_{cyc}^i \frac{|DOD_k|^\beta}{DOD_{ref}}\right)$$

Where Ea,αc2,β are fitting parameters. The default degradation C2,ref is modulated by deviations in reference values of voltage, temperature terms and the throughput term. The throughput term is a cycle average of the depth of discharge, where the number of cycles Ncyci and the associated battery depth of discharge (DOD) is computed over the entire life of the battery (Δtlife) which is sampled into smaller segments of batter operation Δtcyc.

The optimization-oriented model leverages these parameters and simplifies the cyclic fade for degradation, and further for a tractable optimizer design with the approximations. As an example, the rain flow count analysis is unsuitable from an optimization perspective and alternate representations may be considered. Instead of a rain flow analysis for cycle counting, half a cycle is counted at every instant of time, and if no battery power is consumed, a zero DOD would result in a zero-throughput term. In another example, the trip times over which power management problem may be solved, typically occurs over a few hours. A few hours are shorter than the sample times assumed in the identification of the parameters. The reference degradation rates are hence scaled and given by:

$$Kref = C2, ref(tf/\Delta tcyc)$$

Where Kref is the cyclic degradation for a given battery operating and cycling condition for tf, C2,ref cyclic degradation for a reference operating condition for Δtcyc, and Δtcyc is a sample time for parameter identification of life model using cell test data.

In yet another example, the discrete-time representation of the optimizer-oriented degradation (dQopt) is denoted by life factor LF, and is given by $$dQ_{opt} = K_{ref}\left(\sum_{k=0}^{N} e^{E_a\left(\frac{1}{T_{ref}} - \frac{1}{T_k}\right)} SOE_k \alpha_k \delta x_k\right)\left(\sum_{k=0}^{N} \frac{1}{2}\frac{|DOD_k|^\beta}{DOD_{ref}}\right)$$

Where N is the number of distance mesh points, Ea is the activation potential, and SOE is battery temperature, voltage, and charge state.

In another example, the following approximation has been considered:

$$dQ_{opt} = K_{ref}\left(\sum_{k=0}^{N} e^{E_a\left(\frac{1}{T_{ref}} - \frac{1}{T_k}\right)} e^{\left[\frac{AF}{R_{ug}}\left(\frac{V_k}{T_{bk}} - \frac{V_{ref}}{T_{ref}}\right)\right]} \alpha_k \delta x_k\right)\left(\sum_{k=0}^{N} \frac{1}{2}\frac{|DOD_k|^\beta}{DOD_{ref}}\right)$$

Where Ea, A, and beta are the temperature, voltage and throughput acceleration parameters determined empirically In yet another example, a battery thermal and voltage model may be provided. In particular, the heat generated due to battery utilization results in a temperature change that impacts the life of the battery. In addition, reduction of thermal swings assists in reducing or minimizing the cooling requirements that is important to battery temperature. The thermal model is provided by:

$$[\epsilon_1, \epsilon_2, f^*_{[0:N]}, \alpha^*_{[0:N]}, P^*_{b,[0:N]}] =$$

$$\arg\min_{\{P_{b,k}, F_{-k}, \alpha_k\}}\left(k_1 \sum_{k=0:N} x_k \alpha_k \gamma_{fuel}(F_k/\alpha_k - P_{bk})\right) +$$

-continued $$C_{dQtoFuel}\left(\sum_{k=0}^{N} \delta x_k \alpha_k K_{ref} e^{-\frac{E_a}{R}\left(\frac{1}{T_k} - \frac{1}{T_k}\right)} SOE_k\right)\left(\sum_{k=0:N} \frac{1}{2}\left(\frac{|DOD_k|}{DOD_{ref}}\right)^\beta\right) + M_{\epsilon_1}\epsilon_1$$

Where N represents a total distance discretized into N mesh points, or points along a route during a trip; k∈[0:N] is an index of mesh points along the route; $\delta x_k$ is a distance from the start of a trip to the mesh point; $\alpha_k$ is $1/V_k$ where $V_k$ is the speed of the vehicle at the mesh point; $\overline{P}_{bk}$ is the energy storage device power at the mesh point; $F_k$ is the engine tractive effort at the mesh point; $\delta x_k \alpha_k$ is time at the mesh point; and $T_k$ is the temperature of the energy storage device at the mesh point; and $C_{dQtoFuel}$ is the cost savings provided by increasing the energy storage device life compared to the cost of burning the fuel of the engine to receive those savings, and may be represented by −(($/dq %)/($/lb)).

At step 506, a change in life of an on-board energy storage device is determined based on the operation of a vehicle subsystem. In one example the vehicle subsystem is a cooling system. The cooling system may include plural fans or fan devices that may be driven by a variable drive. As an example, strings of cooling fans may be provided in series wherein a controller may determine the strings of fans that operate compared to the strings of fans that do not operate. Alternatively, fan speed of the fans may vary based on the determined cooling. As a result, determinations may be made related to the operation of the cooling subsystem and the life of the energy storage device may change based on varying the thermal properties of the energy storage device by using the cooling system. Alternatively, other subsystems, including the braking subsystem, throttle subsystem, or the like may be used to determine the effect of the subsystem on the life of the on-board energy storage device.

A reduction in life of the energy storage device may be determined based on the operational parameters. When determining the energy storage device life based on thermal properties of the energy storage device, the determination may include predicting operation of a vehicle subsystem to increase the life of the energy storage device during the trip.

At step 508, a change in fuel usage of an engine (or fuel cell) is determined based on the operation of the vehicle subsystem during the trip. At high speeds of a vehicle that higher voltages result in higher use temperatures that may provide an expediential degradation of the battery. To combat this thermal wear, a cooling system may be implemented to reduce these higher temperatures to improve the battery life during operation. Still, operating the cooling system may be done at a cost, where fuel may be burned to drive a cooling system such as a fan, air moving device, etc. to cool the battery. If the cost of the fuel to cool the energy storage device is greater than the cost saved by extending energy storage device life because of cooling, there is no reason to cool the energy storage device, even though cooling will improve operation of the energy storage device. Included in the determination of this tradeoff is that fuel costs and energy storage device charging costs may vary depending on the geographic region a vehicle is traveling. The determination provided considers these variables when determining a trip plan for a vehicle.

At step 510, a trip plan for a trip of the vehicle system along the route is generated based on at least one of the engine operational parameters or the energy storage device operational parameters. The trip plan may be generated by a controller that includes one or more processors. The trip plan designates one or more operational settings for the vehicle system as a function of one or more of time or distance along the route. The operational settings are designated to drive the vehicle system toward achievement of one or more objectives of the trip plan.

Generating the trip plan may include designating one or more of fuel efficiency, energy storage device usage, speeds, throttle settings, brake settings, or accelerations as the operational settings of the trip plan. The trip plan may be generated to drive the vehicle system toward achievement of the one or more objectives while satisfying one or more of speed limits, vehicle capability constraints, trip schedule times, or emissions limits.

In one example, a look-ahead algorithm may be provided, and may be designed to utilize the battery for increased fuel savings with reduced battery degradation that justifies the fuel savings. The algorithm may consider user inputs along with terrain, and system configuration inputs. The system configuration inputs may include the engine operational parameters, and the battery operational parameters as previously determined as described above.

For a given set of inputs, the algorithm enhances over tractive effort (Fk), speed (vk) and battery power (Pbk) for the entire trip duration that would reduce or minimize a fuel-life multi-objective function subject to a set of constraints. The objective function is given as:

$$J_{EM} = \sum_{k=0}^{N}(\gamma(\eta_t F_k v_k - P_{net}(P_{bk}))) + \lambda dQ_{opt}$$

Where ηtFkvk is tractive power, where ηt is the traction efficiency and Pnet(Pbk) is the net battery power available after accounting for the battery system losses. The penalty parameter is considered to alter the battery utilization to generate tradeoff curves, and is typically the ratio of battery to fuel cost. When the battery costs are expensive, the parameter may be set to a higher value which would limit the battery usage to preserve life and vice-versa. Thus, the algorithm may be defined as below:

$$\min_{F_k, \alpha_k, P_{bk}} J_{EM}$$

$$h(F_k, F_{k+1}, \alpha_k, \alpha_{k+1}, \delta x_k, a, b, c) = 0,$$

$$SOE_k = SOE_{k-1} + \frac{\delta x_{k-1}}{E_{max} v_{k-1}}(P_{b,k-1}),$$

$$T_{bk} = T_{b,k-1} + \frac{\delta t_{k-1}}{C_{batt}}\left(Q_{gen} + \frac{T_{amb} - T_{b,k-1}}{R_{batt}}\right)$$

$$\sum_{k=0}^{N}(t_{k+1} - t_k) \leq t_f$$

$$\alpha_{min,k} \leq \alpha_k \leq \alpha_{max,k}$$

$$F_{min} \leq F_k \leq F_{max}$$

$$R_L \frac{(\alpha_k + \alpha_{k+1})}{2} \leq \frac{F_{k+1} - F_k}{\delta x_k} \leq R_U \frac{(\alpha_k + \alpha_{k+1})}{2}$$

$$P_{min} \leq F_k/\alpha_k - P_{net}(P_{bk}) \leq P_{max}$$

$$P_{b,min}(SOE_k) \leq P_{bk} \leq P_{b,max}(SOE_k)$$

$$T_{b,min} \leq T_{bk} \leq T_{b,max}$$

$$SOE_{min} \leq SOE_k \leq SOE_{max}$$

$$R_{LB}\frac{\alpha_k + \alpha_{k+1}}{2} \leq \frac{P_{bk+1} - P_{bk}}{\delta x_k} \leq R_{UB}\frac{(\alpha_k + \alpha_{k+1})}{2}$$

Where the DOD is computed as the change in SOE between successive time instants (DODk=SOEk−3 SOEk−1). The inverse of speed (αk) is used as this helps in formulating many constraints to be linear which simplifies the problem.

These sets of equations utilized by the algorithm represent, among other things, the dynamics of the vehicle system along with the battery state of charge and temperature respectively. Additionally described, may be the travel time along with the speed limits while the tractive effort and the rate limits are provided. The engine power may be computed as the difference between the tractive power requirement and the net battery power. The engine power may be limited as given where Pmin and Pmax are the engine limits. The total tractive power may reach beyond a current upper limit on the throttle or notch value.

The constraints are also specific to battery utilization. These include the battery power temperature, SOE limits, and rate of change of battery power. Lower and upper limits on battery power can be a function of the SOE. For example, the discharge capabilities can reduce significantly at lower SOE, limiting the available power. Similarly, charging capabilities may increase significantly at higher SOE.

The tradeoff may be the engine-battery operation where the fuel savings justify the battery degradation costs. In contrast, a trip algorithm for multi-source vehicles merely reduces the total fuel γ(ηtFkvk). Thus, when λ>>1, the solution approaches a fuel optimal solution. The above algorithm may be classified as a non-linear programming problem and may be solved utilizing the interior-point solved IpOpt. The scope of the formulation described may be restricted to vehicle systems which have independent power command to engine and battery. In addition, the consist makeup may be restricted to conventional vehicle systems. The inclusion of these options may be driven by vehicle system infrastructure such as high voltage lines, consist communication, etc.

In yet another example, the trip plan may also include additional supplementation to the energy storage device along a route during the trip to provide additional power when traversing terrains. For example, the energy storage device may electrically couple to a local catenary that provides supplemental electricity to the energy storage device. Alternatively, the energy storage device may mechanically couple to a wayside device such as a charging station during the trip. Alternatively, the energy storage device may electrically couple to a rail that carries electric current. In each instance, the propulsion system receives supplemental power from a remote device that couples to the propulsion system.

In another example, when thermal characteristics of the energy storage device are determined the trip plan is generated based on the thermal characteristics of the energy storage device. A determination related to a subsystem, such as a cooling system may be provided where a cost in fuel of operating the cooling system is compared to the savings in fuel resulting from increasing the energy storage device life because of operating the cooling system. Based at least in part on this determination, the trip plan may be generated. In one example, while operating the cooling system will save the cost of ten gallons of fuel over a trip, the cost of operating the cooling system will provide a cost of twelve gallons of fuel. Because the saving does not meet the cost threshold determined, the trip plan does not include operating the cooling system. In another example, the saving of operating the cooling system is a savings of twelve gallons of fuel, and the cost of operating the cooling system is ten gallons of fuel. In this instance, the threshold for operating the cooling system is exceed and a trip plan is generated that includes operating the cooling system during the trip.

At step 512, an operating mode of the vehicle subsystem is switched based at least in part on one of the change in the life of the on-board energy storage device, or the change in the fuel usage of the engine or the fuel cell. In one example the operating mode is changed by a vehicle controller in accordance with a trip plan. In another example, the operating modes are switched to provide a thermal reduction of an on-board energy storage device. The vehicle subsystem may be a cooling subsystem, or an auxiliary subsystem and may include braking subsystems, throttle subsystems, etc. The determination to switch the operating mode may be based on energy storage operational parameters, engine operational parameters, fuel cost, energy storage device use cost, calculations or determinations discussed above, or the like. In one example, switching the operating mode of the vehicle subsystem may be based at least in part on engine operational parameters selected from engine type, engine volume, engine efficiency, and engine horsepower.

Switching operating modes may include activating a subsystem, operating a subsystem at different thresholds, operating according to a schedule, or the like. In one example when the subsystem is a cooling system, the cooling system may be switched from an off, or non-operating mode to an on or operating mode. In another example, the cooling system may have five strings of fan devices in series. The operating mode may be switched by increasing the number of strings that are operational from one string of fan devices to three strings of fan devices. Similarly, decreasing the number of strings from five strings to four strings could be a switching of an operating mode. In yet another example of switching operating modes, the speed at which a fan device rotates may increase from a first speed to a second speed or decrease from a first speed to a second speed. In yet another example, the cooling system may include louvers and the switching of the operating mode may include increasing the number of louvers that are open from a first number to a second number or decreasing the number of louvers that are open from a first number to a second number. Thus, by changing the cooling output of a cooling system an operation mode is switched from a first operation mode to a second operation mode.

Figure 6:
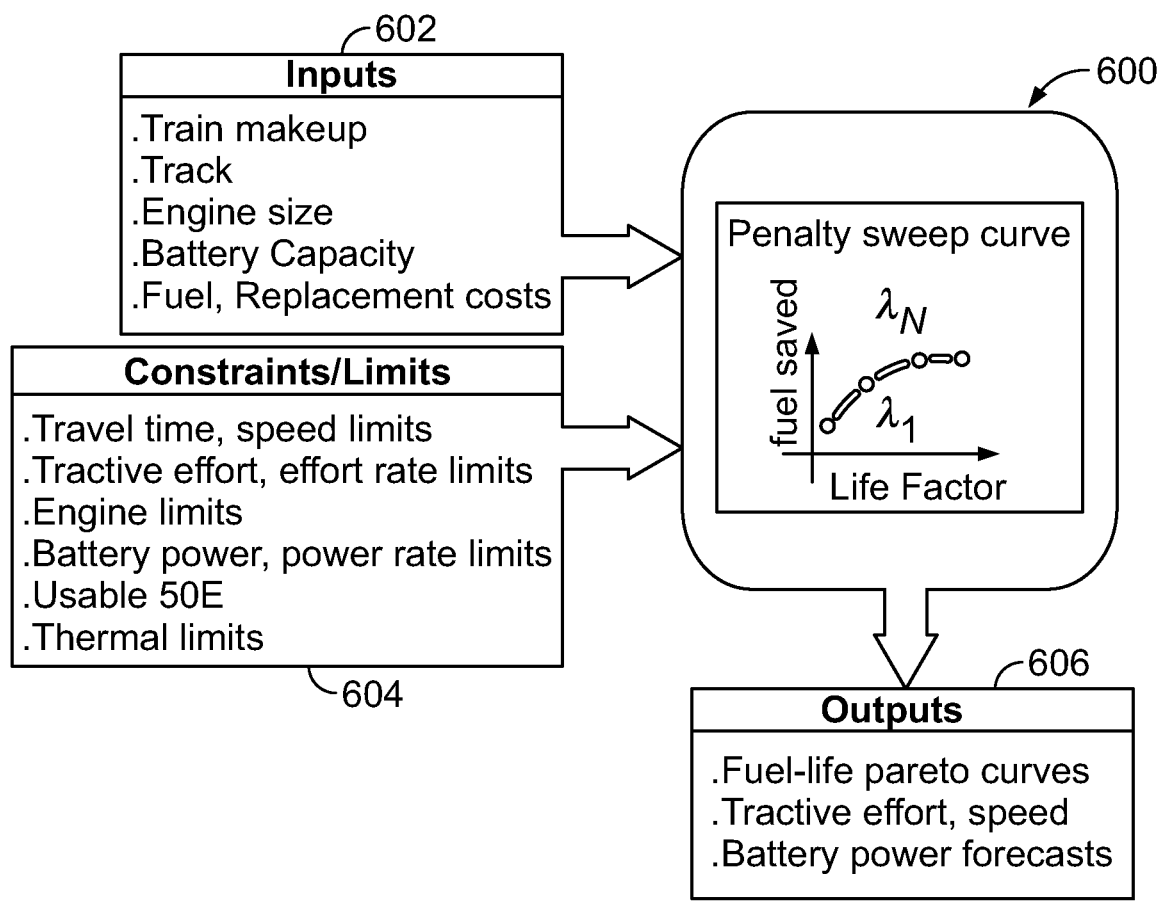
FIG. 6 is a schematic diagram of one embodiment of a trip planner algorithm.

FIG. 6 is a schematic diagram of one embodiment of a trip planner algorithm 600 according to one embodiment. The algorithm may receive inputs 602 from on-board and off-board sources related to a trip, including vehicle-based inputs and trip-based inputs. The inputs may be received by the trip characterization element, vehicle characterization element, one or more sensors, or the like. In one example, the trip characterization element, vehicle characterization element, and one or more sensors as described in relation to FIGS. 1 and 2 may be inputs. The inputs may include vehicle make-up, route information, engine size, battery capacity, fuel costs, component replacement costs, etc. In one example the vehicle may be a rail vehicle that may include a makeup of propulsion vehicle and non-propulsion vehicles. The propulsion vehicles may be drive by internal combustion engines, energy storage device, be multi-source vehicles, a combination of these, or the like. In one example, the route information may include information related to a track, that make include track curvature information, track traffic information, or the like.

The algorithm also receives constraints and limits 604 associated with the vehicle system and the trip. For example, the constraints and limits may include trip travel time, and trip speed limits, including speed limits in different regions of the trip. The constraints and limits may also include tractive effort, and effort rate limits. In one example, tractive effort and/or effort rate limits are determined as described in association with FIG. 5. The constraints and limits may also include engine limits, battery power, power rate limits, useable SOE, thermal limits, etc.

Based on the inputs, constraints, and limits the algorithm may determine the energy management for a trip. In one example a penalty sweep curve may be provided by determining life factor of an energy storage device compared to an amount of fuel saved by using the energy storage device. In another example, one or more of the determinations and calculations as described in association with FIG. 5 may be used by the algorithm to make the determinations. As a result, outputs 606 are provided for the trip, that may include a trip plan. The outputs may include fuel saved compared to energy storage device life penalty curves, tractive effort, and speed during a trip, that may include individual sections of a trip, battery power forecasts during a trip, etc.

Figure 7:
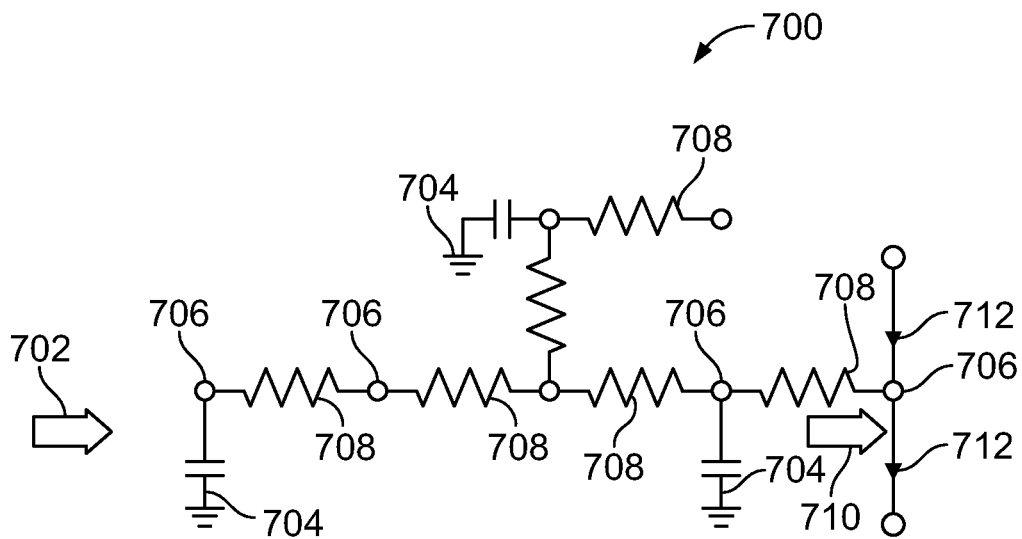
FIG. 7 is a schematic diagram of a thermal circuit.

FIG. 7 illustrates and example thermal circuit 700 for monitoring thermal characteristics of an energy storage device. The thermal circuit receives input heat 702 (Qgen cell) from the energy storage device, along with capacitance inputs 704 to pass the voltage and heat through a series of nodes 706 and resistors 708 to dissipate the heat received. Output heat 710 may then be measured with a series of diodes 712.

The energy balance equation of the thermal circuit is:

$$E_{in} - E_{out} + E_{gen} = E_{stored}$$

Where $E_{in}$ is the energy in, $E_{out}$ is the energy out, $E_{gen}$ is the energy generated, and $E_{stored}$ is the energy stored. This equation may be rewritten as $$C_i \frac{dT_i}{dt} = Q_i + \sum_j \frac{T_j - T_i}{R_{ij}}$$

Where $C_i(dT_i/dt)$ represents the energy stored, $Q_i$ represents the energy generated, and $$\sum_j \frac{T_j - T_i}{R_{ij}}$$

represents energy in compared to energy out; where capacitance $C_i = \rho_i c_{p,i} V_i$, Q is internal heat generation, R is thermal resistance, i is a node focus, and j is a neighboring node. In one example, dt=to five seconds to ten seconds. When taking this as a discretized equation:

$$C_i^p \frac{T_j^{p+1} - T_i^p}{\Delta t^p} = \dot{Q}_i^p + \sum_j \frac{T_j^p - T_i^p}{R_{ij}^p}$$

where p is a previous time step and p+1 is a current time step. Thus, through Euler discretization:

$$C \frac{dT_{cell}}{dt} = Q_{i^2 R} + Q_{entropy} + \frac{T_{cell} - T_{amb}}{R}$$

As a result, the thermal mass of the energy storage device and thermal characteristics may be determined accordingly.

In an alternative embodiment, the thermal characteristics are modeled over a determined cycle $t_{cyc}$. Specifically, the open circuit voltage over time may be modeled as a function of the state of charge (SOC) of the energy storage device. From the modeling, constants may be determined, and an equation provided to model, or stitch, the curve of an energy storage device profile for a trip over the determined cycle. In one example, the determined cycle may be fourteen days, and the equation may be:

$$OCV_{26AH}^{4123}(t) = 2.766 - 2.95\ SOC + 2.92 SOC^{\frac{1}{2}} + 1.32 SOC^2$$

Where OCV is the open circuit voltage and SOC is the state of charge.

Thus, provided are systems and methods for determining the tradeoff between fuel consumption and life capacity of an energy storage device for a trip, includes how functional subsystems may affect the determinations. By determining the tradeoff for a multi-source vehicle instead of merely operating an energy storage device at a setting without consideration of the overall effect to the system, fuel is conserved, costs reduced, and efficiencies improved. While described in relation to the cooling subsystem, other subsystems are contemplated.

In one or more embodiment, a method may be provided for a vehicle system that can move along one or more routes during a trip. The method may include determining a change in life of an on-board energy storage device based on operation of a vehicle subsystem during the trip, determining a change in power usage of a power source or a fuel usage based on the operation of the vehicle subsystem during the trip, and switching an operating mode of the vehicle subsystem based at least in part on one of the change in the life of the on-board energy storage device, or the change in the power usage or fuel usage.

Switching the operating mode of the vehicle subsystem may include operating the vehicle subsystem to provide a thermal reduction of the on-board energy storage device during the trip. In one aspect, providing the thermal reduction may include operating a cooling subsystem. In another aspect, the method may also include generating a trip plan based at least in part on determining a fuel cost or an energy storage device cost savings for at least a section of the one or more routes of the trip. In one example, switching the operating mode of the vehicle subsystem may include switching operating modes of at least one auxiliary vehicle subsystems during the trip. In another example, the method may include determining a trip plan based on switching the operating mode of the vehicle subsystem and switching one or more energy storage device operational parameters during the trip based on the trip plan. In examples, the energy storage device operational parameters may include at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency. In another example, switching the operating mode of the vehicle subsystem may be based at least in part on engine operational parameters selected from engine type, engine volume, engine efficiency, and engine horsepower.

In one or more embodiment, a system may include a controller that can determine a change in capacity of an on-board energy storage device based on operation of a vehicle subsystem during a trip and determine a change in power usage or in fuel usage based on the operation of the vehicle subsystem during the trip. The controller may switch an operating mode of the vehicle subsystem based at least in part on one of the change in the capacity of the on-board energy storage device, or the change in the power usage and/or the fuel usage of the engine or the fuel cell.

Additionally, the controller may operate the vehicle subsystem to provide a thermal reduction of the on-board energy storage device during the trip. In one aspect, the vehicle subsystem may be a cooling subsystem. The controller may determine a fuel cost for the trip. In one aspect, the controller may generate a trip plan based at least in part on determining the fuel cost for the trip. In another aspect, the controller may switch an operating mode of at least one auxiliary vehicle subsystem during the trip. In one example, the controller may switch one or more energy storage device operational parameters during the trip. In another example, the controller may switch the operating mode of the vehicle subsystem based at least in part on engine operational parameters.

In one or more embodiments, a method may be provided for a vehicle system configured for movement along one or more routes during a trip. The method may include determining a change in life of an on-board energy storage device based on operation of a cooling subsystem during the trip, determining a change in fuel usage based at least in part on the operation of the cooling subsystem during the trip, and switching an operating mode of the cooling subsystem to reduce thermal characteristics of the on-board energy storage device.

Additionally, switching the operating mode of the cooling subsystem to reduce thermal characteristics of the on-board energy storage device may include comparing an on-board energy storage device cost savings based on operating the cooling subsystem to a fuel usage cost based on operating the cooling subsystem. In one aspect, determining the change in the capacity of the on-board energy storage device based on the operation of the cooling subsystem may include determining an effect on the thermal characteristics of the energy storage device based on operating the cooling subsystem. In examples, determining the effect on the thermal characteristics of the on-board energy storage device may include determining at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The controller can use this artificial intelligence or machine learning to receive input (e.g., battery characteristics, engine characteristics, etc.), use a model that determines an objective of a trip such as reducing costs, reducing emissions, or the like. The controller may receive additional input such as actual costs of a trip, actual fuel emissions during a trip, etc., that indicates whether the machine-selected trip plan provided a desirable outcome or not. Based on this additional input, the controller can change the model, such as by changing weight of inputs utilized to make determinations regarding the objective. The controller can then use the changed or updated model again to provide a trip plan utilized for obtaining the desired objective, in additional iterations to repeatedly improve or change the model using artificial intelligence or machine learning.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   obtaining a battery input and an engine or fuel cell input from one or more sensors;
   calculating a change in life of an on-board energy storage device utilizing an artificial intelligence algorithm, the change in life determined based on operation of a vehicle subsystem during a trip and the battery input;
   calculating a change in fuel usage utilizing the artificial intelligence algorithm, the change in fuel usage determined based on the operation of the vehicle subsystem during the trip and the engine or fuel cell input; and
   switching an operating mode of the vehicle subsystem based at least in part on the change in the life of the on-board energy storage device and based on the operation of the vehicle subsystem compared to the change in the fuel usage of the engine or the fuel cell based on the operation of the vehicle subsystem.

2. The method of claim 1, wherein switching the operating mode of the vehicle subsystem comprises operating the vehicle subsystem to provide a thermal management of the on-board energy storage device during the trip.

3. The method of claim 2, wherein providing the thermal reduction comprises operating a thermal management subsystem.

4. The method of claim 1, further comprising generating a trip plan based at least in part on determining a fuel cost or an energy storage device cost savings for at least a section of one or more routes of the trip.

5. The method of claim 1, wherein the battery input includes at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency.

6. The method of claim 1, further comprising determining a trip plan based on switching the operating mode of the vehicle subsystem and switching one or more energy storage device operational parameters during the trip based on the trip plan.

7. The method of claim 6, wherein the one or more energy storage device operational parameters include at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency.

8. The method of claim 1, wherein the engine or fuel cell input includes at least one of engine fluid level, engine temperature, or engine speed.

9. The method of claim 1, wherein calculating the change in the life of the on-board energy storage device based on the operation of the vehicle subsystem comprises determining an effect on thermal characteristics of the on-board energy storage device based on the operation of the vehicle subsystem.

10. A system comprising:
    a battery sensor configured to obtain a battery input;
    a fuel usage sensor configured to obtain an engine or fuel cell input;
    a controller configured to:
    calculate a change in life of an on-board energy storage device utilizing an artificial intelligence algorithm, the change in life calculated based on operation of a vehicle subsystem during a trip and the battery input;
    calculate a change in fuel usage utilizing the artificial intelligence algorithm, the change in fuel usage calculated based on the operation of the vehicle subsystem during the trip and the engine or fuel cell input; and
    switch an operating mode of the vehicle subsystem based at least in part on the change in the life of the on-board energy storage device based on the operation of the vehicle subsystem compared to the change in the fuel usage of the engine or the fuel cell based on the operation of the vehicle subsystem.

11. The system of claim 10, wherein the controller is configured to operate the vehicle subsystem to provide a thermal reduction of the on-board energy storage device during the trip.

12. The system of claim 11, wherein the vehicle subsystem is a cooling subsystem or heating subsystem.

13. The system of claim 10, wherein the battery input includes at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency.

14. The system of claim 13, wherein the controller is configured to generate a trip plan based at least in part on determining the fuel cost for the trip.

15. The system of claim 10, wherein the controller is configured to switch an operating mode of at least one auxiliary vehicle subsystem during the trip.

16. The system of claim 10, wherein the engine or fuel cell input includes at least one of engine fluid level, engine temperature, or engine speed.

17. The system of claim 10, wherein the controller is configured to switch the operating mode of the vehicle subsystem based at least in part on engine operational parameters.

18. A method for a vehicle system configured for movement along one or more routes during a trip, comprising:
obtaining a battery input and a fuel usage input from one or more sensors;
calculating a change in life of an on-board energy storage device utilizing an artificial intelligence algorithm based on operation of a vehicle subsystem during a trip and the battery input;
calculating a change in fuel usage utilizing the artificial intelligence algorithm based on the operation of the vehicle subsystem during the trip and the fuel usage input; and
switching an operating mode of a cooling subsystem or heating subsystem to reduce or increase thermal characteristics of the on-board energy storage device based on comparing an on-board energy storage device cost savings based on the operation of the cooling subsystem to a fuel usage cost based on the operation of the cooling subsystem.

19. The method of claim 18, wherein calculating the change in the life of the on-board energy storage device based on the operation of the cooling subsystem or heating subsystem comprises determining an effect on the thermal characteristics of the on-board energy storage device based on the operation of the cooling subsystem or heating subsystem.

20. The method of claim 19, wherein determining the effect on the thermal characteristics of the on-board energy storage device includes determining at least one of initial battery capacity, battery C-rate, battery power, battery degradation, existing battery life, battery power rate limits, battery temperature, battery voltage, battery state of charge, battery depth of discharge, battery ohmic resistance, battery nameplate capacity, or cycling frequency.

* * * * *